US012680214B2

(12) United States Patent
Suzuki et al.

(10) Patent No.: US 12,680,214 B2
(45) Date of Patent: Jul. 14, 2026

(54) DRUM-TYPE WASHING MACHINE

(71) Applicant: Samsung Electronics Co., Ltd., Suwon-si (KR)

(72) Inventors: Yuichi Suzuki, Yokohama (JP); Takahiro Nakashima, Yokohama (JP); Yoshiyuki Nishioka, Yokohama (JP); Hogyo Hoshiyama, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 272 days.

(21) Appl. No.: 18/422,273

(22) Filed: Jan. 25, 2024

(65) Prior Publication Data

US 2024/0158979 A1     May 16, 2024

Related U.S. Application Data

(63) Continuation of application No. PCT/KR2022/010581, filed on Jul. 20, 2022.

(30) Foreign Application Priority Data

Sep. 16, 2021     (JP) ................................. 2021-150981

(51) Int. Cl.
*D06F 37/26* (2006.01)
*D06F 23/02* (2006.01)
(Continued)

(52) U.S. Cl.
CPC ............ *D06F 37/267* (2013.01); *D06F 23/02* (2013.01); *D06F 39/083* (2013.01); *D06F 39/088* (2013.01); *F16L 55/027* (2013.01)

(58) Field of Classification Search
CPC .................................................. B01D 11/0288
See application file for complete search history.

(56) References Cited

U.S. PATENT DOCUMENTS

| | | | |
|---|---|---|---|
| 7,607,327 B2 | 10/2009 | Sumida et al. | |
| 7,748,242 B2 | 7/2010 | Saito et al. | |

(Continued)

FOREIGN PATENT DOCUMENTS

| | | |
|---|---|---|
| CN | 109423803 A | 3/2019 |
| JP | 8-193687 | 7/1996 |

(Continued)

OTHER PUBLICATIONS

PCT/ISA/220; PCT/ISA/210; PCT/ISA/237 dated Oct. 27, 2022 in International Patent Application No. PCT/KR2022/010581.

(Continued)

*Primary Examiner* — Jason Y Ko

(74) *Attorney, Agent, or Firm* — STAAS & HALSEY LLP

(57) ABSTRACT

A drum-type washing machine including a casing having an inlet through which laundry is loaded and unloaded, a tub arrangeable in the casing so that while the tub is arranged in the casing, an inside of the tub is accessible through the inlet, the tub being able to store water, a drum arrangeable in the tub to rotate about an axis extending in forward and rearward directions while the laundry is loaded into the drum, a plurality of pipe connection portions, arrangeable on a side surface of the tub, to be connected to pipes, and an air-flow noise reduction mechanism, arrangeable in at least one pipe connection portion among the plurality of pipe connection portions, to control air-flow caused by rotation of the drum.

15 Claims, 13 Drawing Sheets

(51) Int. Cl.
    *D06F 39/08*    (2006.01)
    *F16L 55/027*    (2006.01)

(56)             References Cited

U.S. PATENT DOCUMENTS

| | | |
|---|---|---|
| 2006/0096336 A1 | 5/2006 | Sumida et al. |
| 2007/0028398 A1 | 2/2007 | Kwon et al. |
| 2020/0063316 A1 | 2/2020 | Kim et al. |

FOREIGN PATENT DOCUMENTS

| | | |
|---|---|---|
| JP | 09-075586 | 3/1997 |
| JP | 11-290583 | 10/1999 |
| JP | 2000-325692 | 11/2000 |
| JP | 2003-290586 | 10/2003 |
| JP | 2006-130199 | 5/2006 |
| JP | 2006-223564 | 8/2006 |
| JP | 2007-219359 | 8/2007 |
| JP | 2009-72505 | 4/2009 |
| JP | 2014-90942 | 5/2014 |
| JP | 6663827 | 3/2020 |
| KR | 10-0671833 | 1/2007 |
| KR | 10-2007-0015286 | 2/2007 |
| KR | 10-0769766 | 10/2007 |
| KR | 10-2018-0027046 | 3/2018 |
| KR | 10-1901367 | 9/2018 |
| KR | 10-2020-0022689 | 3/2020 |
| KR | 10-2557577 | 7/2023 |
| WO | WO 2006/080800 A1 | 8/2006 |

OTHER PUBLICATIONS

Japanese Office Action dated Jun. 17, 2025 for JP Patent Application No. 2021-150981.

DRUM-TYPE WASHING MACHINE

CROSS-REFERENCE TO RELATED APPLICATION

This application is a continuation application, under 35 U.S.C. § 111(a), of international application No. PCT/KR2022/010581, filed on Jul. 20, 2022, which claims priority under 35 U. S. C. § 119 to Japanese Patent Application No. 2021-150981, filed on Sep. 16, 2021, in the Japanese Intellectual Property Office, the disclosures of which are incorporated by reference herein in their entireties.

TECHNICAL FIELD

The present disclosure relates to a drum-type washing machine in which a drum rotates about a horizontal axis.

BACKGROUND ART

In a drum-type washing machine, an inlet through which laundry is loaded into or taken out of a casing is provided at the front of the casing. The case accommodates a tub that is in communication with the inlet and may store water. A rotatable drum is arranged inside the tub, and washing is performed by loading laundry into the drum.

The drum-type washing machine automatically executes a series of washing cycles including washing, rinsing, and spin-drying. Furthermore, the drum-type washing machine may perform a drying cycle. In a spin-drying process, the drum in which wet laundry is accommodated rotates at high speed to discharge, by a centrifugal force, water contained in the laundry into the tub through spin-drying holes formed in the drum.

Japanese Laid-Open Patent Publication No. H8-193687 discloses a noise prevention structure in which a plurality of rectifying plates are arranged in a lattice shape inside a pipe on the downstream side of a fluid control valve. The flow of fluid that is disturbed when passing through the fluid control valve is rectified by the rectifying plate, and thus, vibration in the pipe is reduced and noise is prevented.

DISCLOSURE

Technical Solution

A drum-type washing machine according to an embodiment of the present disclosure includes a casing having an inlet through which laundry is loaded and unloaded; a tub arrangeable in the casing so that while the tub is arranged in the casing, an inside of the tub is accessible through the inlet, the tub being able to store water; a drum arrangeable in the tub to rotate about an axis extending in forward and rearward directions while the laundry is loaded in the drum; and a plurality of pipe connection portions, arrangeable on a side surface of the tub, to be connected to pipes. A air-flow noise reduction mechanism is arrangeable in at least one pipe connection portion among the plurality of pipe connection portions to control air-flow caused by rotation of the drum.

According to the above-described embodiment of the drum-type washing machine, noise occurring in a spin-drying process may be reduced. Thus, it is possible to provide a drum-type washing machine that a user may use comfortably.

MODE FOR INVENTION

Figure 1:
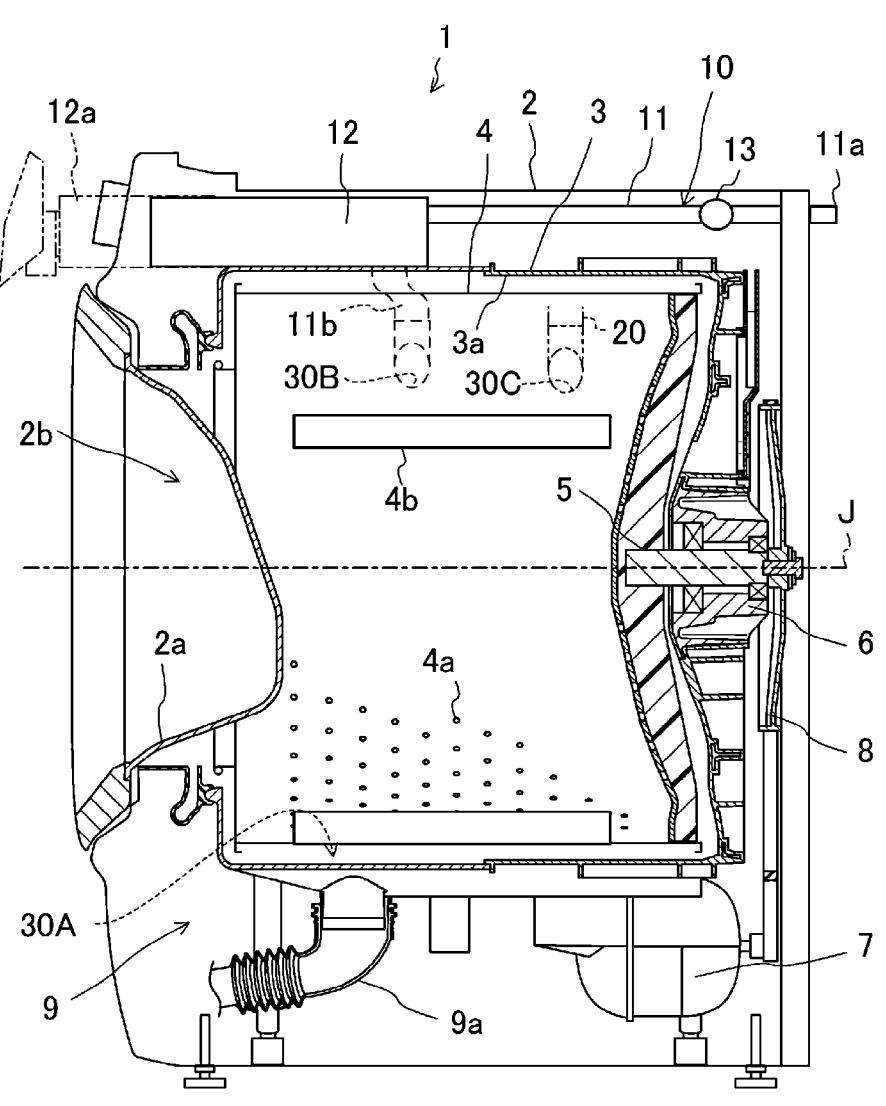
FIG. 1 is a schematic cross-sectional view of a drum-type washing machine according to an embodiment of the present disclosure.

Although the terms used herein are selected from among common terms that are currently widely used in consideration of their functions in the disclosure, the terms may be different according to an intention of one of ordinary skill in the art, a precedent, or the advent of new technology. Also, in particular cases, the terms are discretionally selected by the applicant of the present disclosure, in which case, the meaning of those terms will be described in detail in the corresponding part of the detailed description. Therefore, the terms used herein are not merely designations of the terms, but the terms are defined based on the meaning of the terms and content throughout the present disclosure. Throughout the present specification, when a part "includes" a component, it means that the part may additionally include other components rather than excluding other components as long as there is no particular opposing recitation.

Hereinafter, embodiments will be described with reference to the accompanying drawings in such a manner that the embodiments may be easily carried out by one of skill in the art. The present disclosure may, however, be embodied in many different forms and should not be construed as being limited to an embodiment set forth herein. In order to clearly describe the present disclosure, portions that are not relevant to the description of the present disclosure are omitted, and similar reference numerals are assigned to similar elements throughout the present specification. Hereinafter, embodiments of a washing machine according to the present disclosure will be described with reference to the drawings.

FIG. 1 is a schematic cross-sectional view of a drum-type washing machine according to an embodiment of the present disclosure. A washing machine 1 of the present disclosure is fully automatic and may automatically perform a series of processes including washing, rinsing, and spin-drying. The washing machine 1 does not have a drying function, but may have a structure for performing a drying process.

Referring to FIG. 1, the washing machine 1 may include a casing 2, a tub 3, and a drum 4. The casing 2 may be formed, for example, into the shape of a rectangular parallelepiped, by fitting together a plate-shaped panel and a rectangular frame. An inlet 2b is provided at the front of the casing 2. For example, the inlet 2b may be circular. A door 2a opens and closes the inlet 2b. Laundry is loaded into and taken out of the drum 4, which will be described below, through the inlet 2b.

The tub 3 is a bottomed cylindrical vessel that is installed inside the casing 2 and may store water. The tub 3 is placed horizontally inside the casing 2 such that a central axis J of the tub 3 extends to be substantially horizontal in the frontward and rearward directions or to be inclined downward toward the rear. An opening of the tub 3 is connected to the inlet 2b, and the inside of the tub 3 is in communication with the inlet 2b. The tub 3 is elastically supported on the casing 2 by a plurality of springs (not shown) and dampers (not shown).

The drum 4 is a bottomed cylindrical vessel that is slightly smaller than the tub 3 and is accommodated in the tub 3 such that an opening of the drum 4 faces the inlet 2b. A plurality of water passage holes 4a are formed on the entire surface of a circumferential wall of the drum 4 to penetrate the circumferential wall. A plurality of lifters 4b are installed on an inner circumferential surface of the drum 4.

A bearing unit 6 is installed at the rear of the casing 2 to support a shaft 5 penetrating a bottom portion of the tub 3 such that the shaft 5 is rotatable. As a bottom portion of the drum 4 is supported by the shaft 5, the drum 4 may be rotated about the central axis J.

A motor 7 is installed in a lower portion of the casing 2. A drive shaft of the motor 7 is connected to the shaft 5 through a transmission mechanism 8. Although not illustrated in the drawing, the transmission mechanism 8 may include, for example, a sub-pulley, a belt, and a main pulley. As the motor 7 is driven, the drum 4 may be rotated. In addition, by directly connecting the motor 7 to the shaft 5, the drum 4 may be directly driven by the motor 7.

A drainage device 9 is installed in a lower portion of the casing 2. The drainage device 9 may include a drain pipe 9a and a drain pump (not shown). The upper end of the drain pipe 9a is connected to a drain hole 30A provided at the lower end of the tub 3.

A water supply device 10 is installed in an upper portion of the casing 2. The water supply device 10 may include a water supply pipe 11, a detergent case 12, and an on-off valve 13. The upstream end of the water supply pipe 11 is connected to a water inlet 11a provided at the upper rear of the casing 2. A pipe, such as a hose extending from a faucet or the like, is connected to the water inlet 11a such that pressurized water is supplied.

The on-off valve 13 is arranged downstream of the water inlet 11a of the water supply pipe 11. As a control device (not shown) may control the on-off valve 13 to be opened such that water flows into the water supply pipe 11. The detergent case 12 is arranged downstream of the on-off valve 13 of the water supply pipe 11.

The detergent case 12 is a device for automatically supplying a detergent or the like in a washing process. The detergent case 12 is provided with a detergent container 12a to accommodate chemicals to be used for washing, such as a detergent or a softener. The detergent container 12a may be a tray-shaped container. As indicated by imaginary lines in FIG. 1, the detergent container 12a may be taken out to the front of the casing 2.

The water supply pipe 11 may include a water supply hose 11b. The upper end of the water supply hose 11b is connected to the lower end of the detergent case 12. The lower end of the water supply hose 11b is connected to a water supply hole 30B (a pipe connection portion) that is opened on an upper side surface 3a of the tub 3. Accordingly, when water flows into the detergent case 12 in a state in which a detergent or the like is accommodated in the detergent container 12a, the detergent or the like, along with water, flow into the tub 3 through the water supply hose 11b and the water supply hole 30B.

In addition, a vent hole 30C (a pipe connection portion) to which a vent pipe 20 is connected is opened on the upper side surface 3a of the tub 3. The Inside of the tub 3 Is In communication with the outside of the tub 3 through the vent hole 30C and the vent pipe 20, and the air pressures inside and outside the tub 3 become statically equal to each other (referred to as an open-to-atmosphere state state).

When the washing machine 1 is operated, laundry is loaded into the drum 4 through the inlet 2b. At this time, a detergent or the like may also be loaded into the detergent case 12. Then, in a state in which the door 2a is closed, as a user manipulates a manipulation panel of the washing machine 1 to select a certain washing mode and start washing, a series of washing processes including washing, rinsing, and spin-drying are automatically performed.

For example, the weight of the laundry is measured, and an amount of water supply is set based on a result of the measurement. The set amount of water flows into the water supply pipe 11 by controlling the on-off valve 13. Accordingly, the water and the detergent or the like are introduced into the tub 3. The drum 4 is rotated by driving the motor 7 to perform a washing process.

When the washing process is completed, a rinsing process is performed. When the rinsing process starts, water collected in the tub 3 is first drained by driving the drain pump. Then, water supply or stirring are performed as in the washing process. Depending on the selected washing mode, the washing or rinsing process may be performed multiple times.

When the rinsing process is completed, a spin-drying process is performed. In the spin-drying process, the drum 4 is driven to rotate at high speed for a preset period of time after draining the water. The water contained in the laundry flows out of the drum 4 through the water passage holes 4a by a centrifugal force. Accordingly, the laundry is spin-dried. The water collected in the tub 3 due to the spin-drying is discharged by driving the drain pump.

During the spin-drying process, distinctive noise (air-flow noise) occurs from the inside of the casing 2. The air-flow noise may give the user an unpleasant feeling. As a result of investigating the cause of the air-flow noise, it was found that the main cause was the pipe connection portion provided on the side surface 3a of the tub 3.

Figure 2:
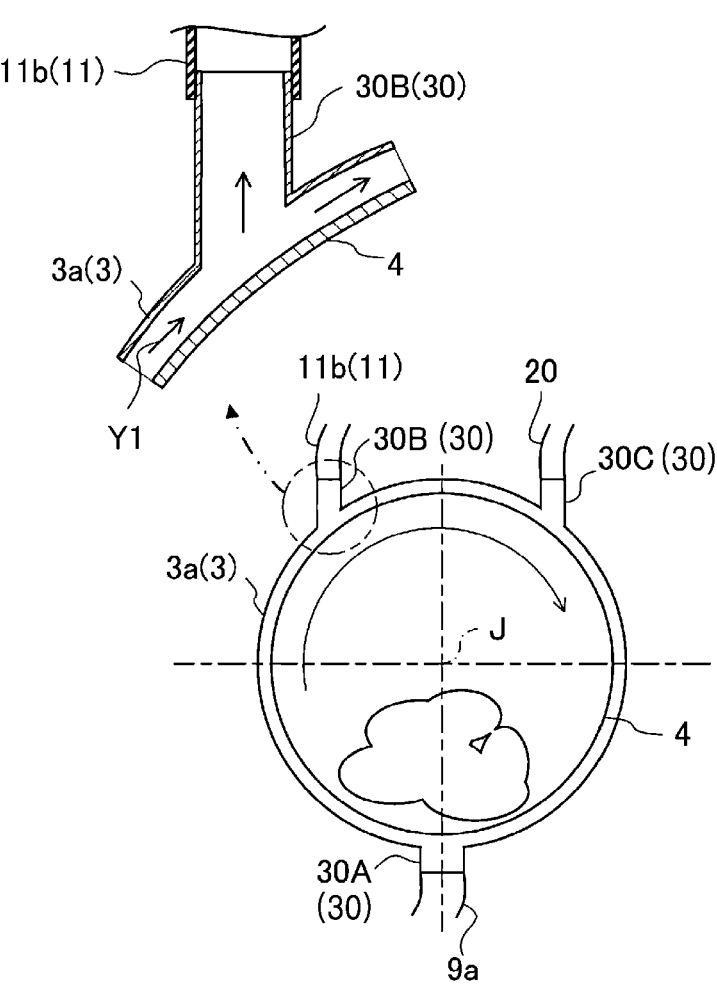
FIG. 2 is a diagram for describing noise occurring in a spin-drying process, according to an embodiment.

FIG. 2 is a diagram for describing noise occurring in a spin-drying process. Referring to FIG. 2, the drum 4, which is required to have a large capacity, is generally accommodated in the tub 3 with a slight gap. Accordingly, when the drum 4 rotates at high speed in a spin-drying process, an air flow (indicated by an arrow Y1 in FIG. 2) is generated between the side surface 3a of the tub 3 and a side surface of the drum 4. The air flow swirls and flows in a certain direction along the side surface 3a of the cylindrical tub 3 (a swirl flow within the tub).

As described above, the water supply hole 30B, the drain hole 30A, and the vent hole 30C are opened on the side surface 3a of the tub 3, and the water supply pipe 11, the drain pipe 9a, the vent pipe 20, and the like are connected to the holes, respectively, to extend outward in the radial direction of the tub 3 (connection portions between the openings and the pipes are collectively referred to as "pipe connection portions 30").

It is presumed that, when the swirl flow within the tub passes through the pipe connection portion 30, disturbances (e.g., turbulences or eddies) of the swirl flow within the tub are cause at an edge of the opening, and as a result, air-flow noise occurs. A result of fluid analysis by modeling the pipe connection portion 30 is illustrated in FIG. 3.

Figure 3:
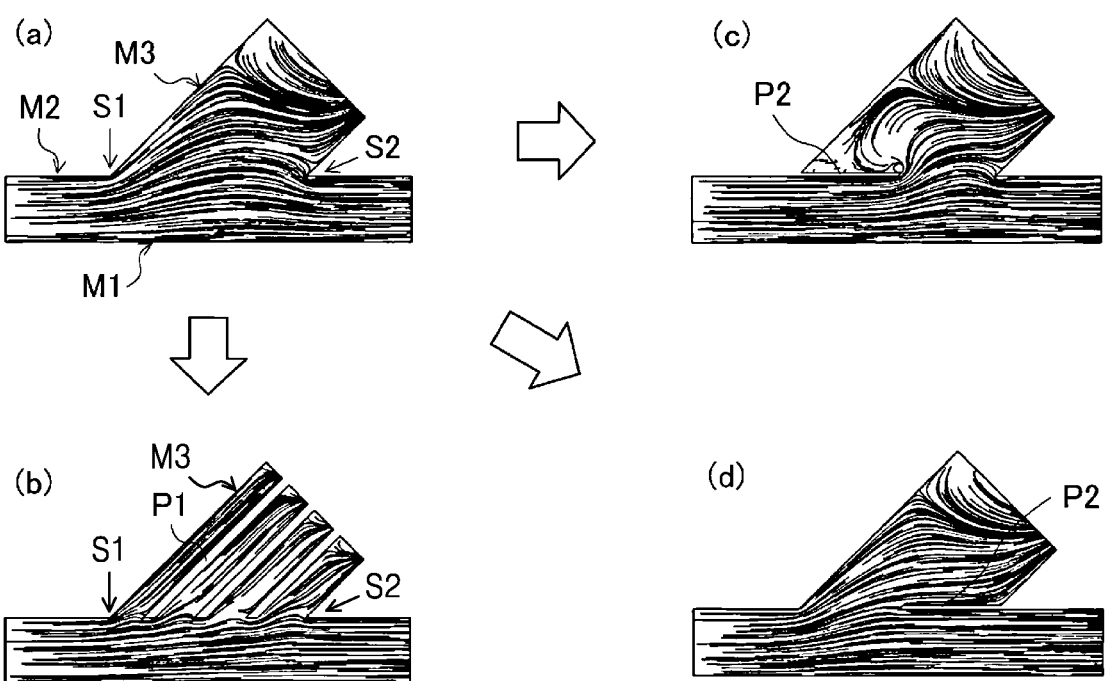
FIG. 3 is a diagram illustrating a result of fluid analysis of air flow generated during a spin-drying process, according to an embodiment.

In FIGS. 3, M1, M2, and M3 represent the side surface of the drum 4, the side surface of the tub 3, and the pipe, respectively, and are all modeled as rigid bodies. The pressures at a downstream outlet of the swirl flow within the tub (i.e., a downstream outlet of a flow path formed between M1 and M2), and an outlet of the pipe M3 is set to zero, and an air flow is set to flow from the inlet side of the swirl flow within the tub at a certain flow rate.

(a) of FIG. 3 is an analysis result in a related-art state. (b) to (d) of FIG. 3 are analysis results of countermeasures (embodiments) based on the analysis result of (a) of FIG. 3. Lines in each drawing represent the velocities and stream-lines of an air flow.

As illustrated in (a) of FIG. 3, at an upstream edge S1 and a downstream edge S2 with respect to the flow direction of the swirl flow within the tub, turbulences or eddies tend to occur in the swirl flow within the tub due to the rapid expansion of the flow path and the meandering of the flow. Although not illustrated, the swirl flow within the tub tends to accelerate at both the upstream edge S1 and the downstream edge S2.

Changes in the flow and velocity of the swirl flow within the tub may cause air-flow noise. Therefore, it may be possible to reduce air-flow noise, that is, noise during a spin-drying process, by suppressing changes in the flow and velocity of the swirl flow within the tub, and various measures therefor have been reviewed.

(b) of FIG. 3 shows an analysis result according to one of the measures (Measure 1). Measure 1 is to install a plurality of partition plates P1 (three partition plates in the illustrated example) extending from an edge of the opening of the pipe connection portion 30 toward the inside of the pipe M3 in the direction in which the pipe M3 extends. The partition plates P1 are arranged in parallel to each other with gaps therebetween.

As illustrated in (b) of FIG. 3, it was confirmed that changes in the flow and velocity of the swirl flow within the tub were suppressed by installing the partition plates P1. In addition, although not illustrated, it was confirmed that an increase in the velocity of the swirl flow within the tub was also suppressed at both the upstream edge S1 and the downstream edge S2. In Measure 1, the air flow in the pipe M3 also tends to be rectified. In addition, in the illustrated example, three partition plates P1 are provided, but the effect is also confirmed even in a case in which one or more partition plates P1 are provided.

(c) of FIG. 3 shows an analysis result according to another one of the measures (Measure 2). Measure 2 is to install a partial cover plate P2 at the opening of the pipe connection portion 30 to cover a portion of the opening. The partial cover plate P2 of Measure 2 is arranged to cover the upstream edge S1.

(d) of FIG. 3 shows an analysis result according to still another one of the measures (Measure 3). Also in Measure 3, the partial cover plate P2 is installed at the opening of the pipe connection portion 30 to cover a portion of the opening. The partial cover plate P2 of Measure 3 is arranged to cover the downstream edge S2.

As illustrated in (c) or (d) of FIG. 3, it is confirmed that, when the partial cover plate P2 is installed to cover a portion of the opening of the pipe connection portion 30, the air flow within the pipe M3 is disturbed, but changes in the flow and velocity of the swirl flow within the tub are suppressed. In addition, although not illustrated, it is also confirmed that an increase in the velocity of the swirl flow within the tub is also suppressed at both the upstream edge S1 and the downstream edge S2.

In addition, in the illustrated examples, the partial cover plates P2 cover the upstream edge S1 and the downstream edge S2, respectively, but the arrangement of the partial cover plate P2 is not limited thereto. By applying the partial cover plate P2 that covers a portion of the opening of the pipe connection portion 30, an air-flow noise prevention effect may be achieved.

Thus, by applying measures (air-flow noise reduction mechanisms) like Measures 1 to 3 to the pipe connection portion 30, it is possible to reduce noise during a spin-drying process. In addition, in the analysis models illustrated in FIG. 3, the pipe M3 has an inclination with respect to the side surface 3a of the tub 3, but even when the pipe M3 is almost perpendicular to the side surface 3a of the tub 3, the same effect may be achieved.

Hereinafter, embodiments of an air-flow noise reduction mechanism will be described based on the above-described analysis results.

Figure 4:
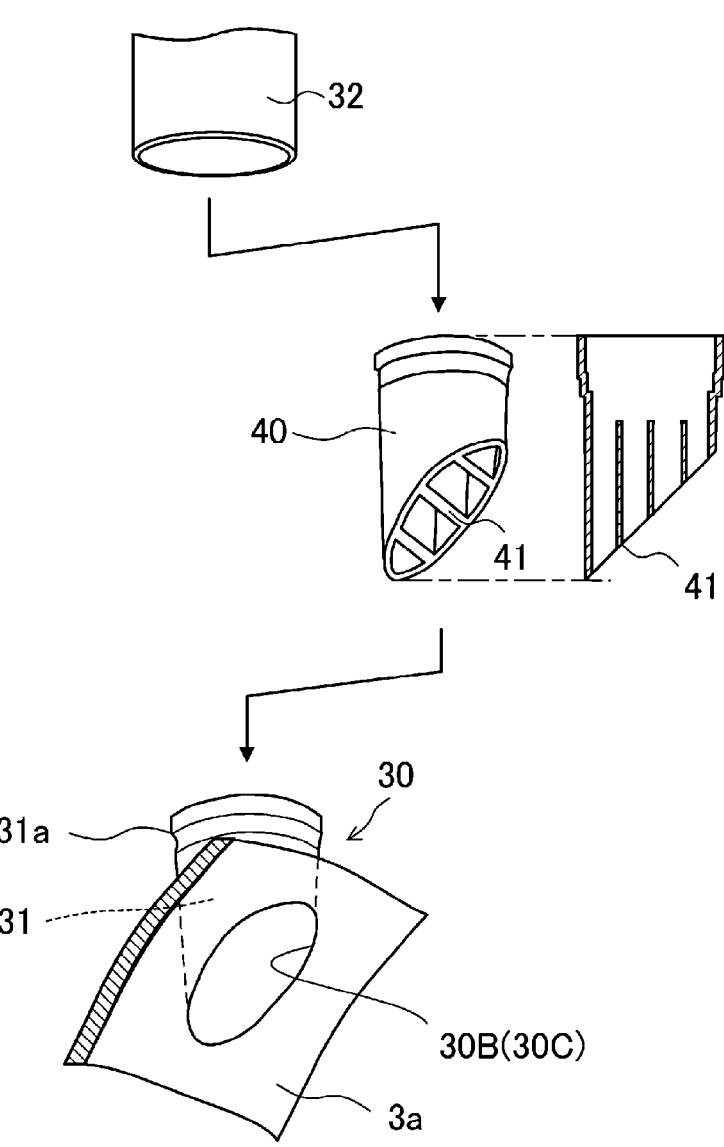
FIG. 4 illustrates an air-flow noise reduction mechanism installed in a pipe connection portion, according to an embodiment.

FIG. 4 illustrates an example of an air-flow noise reduction mechanism installed in the pipe connection portion 30. Referring to FIG. 4, the pipe connection portion 30 may include a connection pipe portion 31, which is a short pipe connected to the side surface 3a of the tub 3. A lower end 32 of a pipe made of a rubber hose or the like is inserted into and coupled to the connection pipe portion 31 with a coupler (not shown).

An embodiment of an air-flow noise reduction mechanism may include a plurality of partition plates 41 corresponding to Measure 1 described above. The plurality of partition plates 41 may be provided in the pipe connection portion 30, for example, inside the connection pipe portion 31. The plurality of partition plates 41 may extend from the pipe connection portion 30, for example, from an edge of the opening of the connection pipe portion 31, into the pipe connection portion 30, for example, the connection pipe portion 31, in the direction in which the pipe connection portion 30, for example, the connection pipe portion 31 extends. Gaps between the plurality of partition plates 41 may be equal to or different from each other. In an embodiment, the plurality of partition plates 41 may be provided in a mounting member 40 inserted into the connection pipe portion 31. The mounting member 40 may have a hollow cylindrical shape. The plurality of partition plates 41 may be provided inside the mounting member 40. The plurality of partition plates 41 may extend from an edge of an opening of the mounting member 40 into the mounting member 40 in the direction in which the mounting member 40 extends.

The mounting member 40 may be integrally formed of a material such as metal, synthetic resin, rubber, or silicone.

The mounting member 40 is formed to have an outer shape that matches the inner shape of the connection pipe portion 31, and the mounting member 40 may be detachably inserted into the connection pipe portion 31.

A separation prevention portion 31*a* with a relatively large diameter is formed on the inlet side of the connection pipe portion 31. The mounting member 40 is held and supported by a step of the separation prevention portion 31*a*. When the mounting member 40 is formed of an elastic member such as rubber or silicon, the mounting member 40 may be easily mounted and air-flow noise may be expected to be reduced due to the elasticity of the mounting member 40.

In addition, in the drain hole 30A, the mounting member 40 is formed to have an outer shape according to the inner shape of the connection pipe portion 31, and the mounting member 40 is inserted into the connection pipe portion 31 through the opening from the inside of the tub 3. For example, in the related-art washing machine 1, the lower end 32 of the pipe is separated from the connection pipe portion 31, and the mounting member 40 is inserted into the connection pipe portion 31. Then, the lower end 32 of the pipe is mounted on the connection pipe portion 31 again. As such, an air-flow noise reduction mechanism may be put into practical use at low cost and with simple manipulation.

Figure 5:
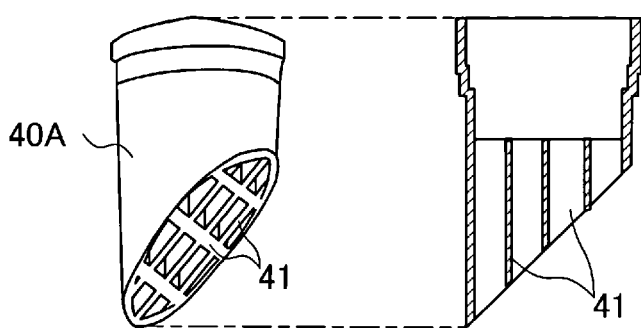
FIG. 5 illustrates an air-flow noise reduction mechanism installed in a pipe connection portion, according to an embodiment.

FIG. 5 illustrates an air-flow noise reduction mechanism installed in the pipe connection portion 30, according to an embodiment. Referring to FIG. 5, a mounting member 40A of the present embodiment is different from the mounting member 40 illustrated in FIG. 4 in that the plurality of partition plates 41 are intersect each other (the cross-section shows a lattice shape), other features are the same as the mounting member 40 illustrated in FIG. 4. Of course, the plurality of partition plates 41 that intersect each other may be provided directly in the connection pipe portion 31.

Figure 6:
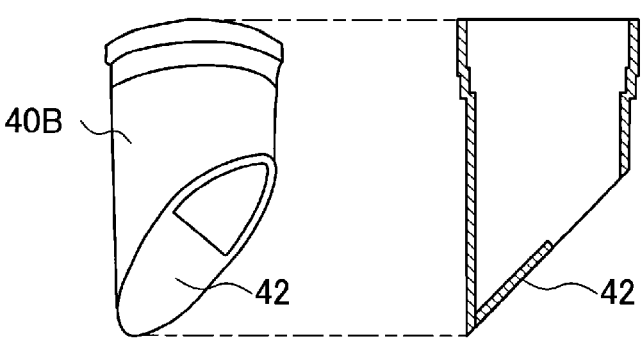
FIG. 6 illustrates an air-flow noise reduction mechanism installed in a pipe connection portion, according to an embodiment.

FIG. 6 illustrates an air-flow noise reduction mechanism installed in the pipe connection portion 30, according to an embodiment. Referring to FIG. 6, a mounting member 40B of the present embodiment is different from the mounting member 40 illustrated in FIG. 4 in that a partial cover plate 42, which is an air-flow noise reduction mechanism corresponding to Measure 2 described above, that is, (c) of FIG. 3, is installed, and other features are the same as the mounting member 40 illustrated in FIG. 4. Of course, the partial cover plate 42 may be provided directly in the connection pipe portion 31.

Figure 7:
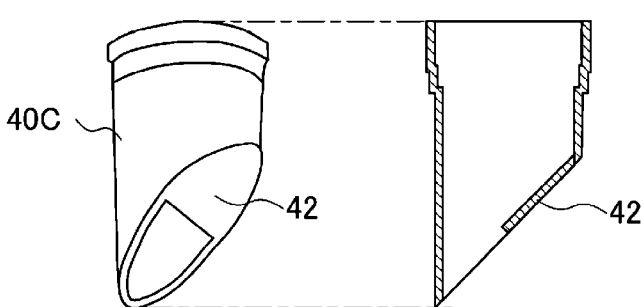
FIG. 7 illustrates an air-flow noise reduction mechanism installed in a pipe connection portion, according to an embodiment.

FIG. 7 illustrates an air-flow noise reduction mechanism installed in the pipe connection portion 30, according to an embodiment. Referring to FIG. 7, a mounting member 40C of the present embodiment is different from the mounting member 40 illustrated in FIG. 4 in that a partial cover plate 42, which is an air-flow noise reduction mechanism corresponding to Measure 3 described above, that is, (d) of FIG. 3, is installed, and other features are the same as the mounting member 40 illustrated in FIG. 4. Of course, the partial cover plate 42 may be provided directly in the connection pipe portion 31.

Figure 8:
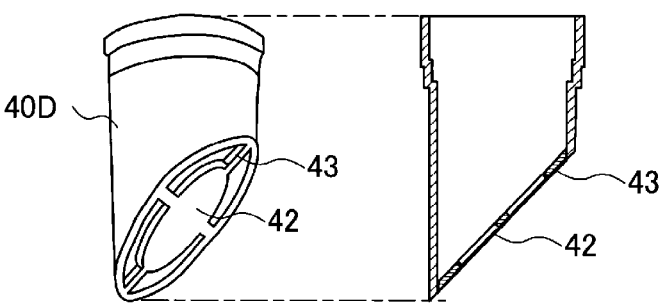
FIG. 8 illustrates an air-flow noise reduction mechanism installed in a pipe connection portion, according to an embodiment.

FIG. 8 illustrates an air-flow noise reduction mechanism installed in the pipe connection portion 30, according to an embodiment. Referring to FIG. 8, an air-flow noise reduction mechanism corresponding to a modification of Measure 2 is installed in a mounting member 40D of the present embodiment. The mounting member 40D of the present embodiment is different from the mounting member 40 illustrated in FIG. 4 in that the partial cover plate 42 is arranged in a central portion of the opening, and other points are the same as the mounting member 40 illustrated in FIG.

4. For example, the partial cover plate 42 may be supported by a plurality of support pieces 43 extending inward from an edge of the opening. Of course, the partial cover plate 42 may be provided directly in the connection pipe portion 31.

In the washing machine 1, chemicals such as a detergent flow into the water supply hole 30B, along with water. Therefore, when the air-flow noise reduction mechanism is installed in the water supply hole 30B, there is a risk that remaining undissolved chemicals may clog the connection pipe portion 31, causing the water not to flow. In the worst case, there is a risk that the water flows back and overflows.

An air-flow noise reduction mechanism 50 (see FIGS. 9 to 12) installed in the water supply hole 30B may have a mechanism to prevent clogging by chemicals. FIGS. 9 to 12 illustrate specific examples of the air-flow noise reduction mechanism 50 having such a clogging prevention mechanism.

Figure 9:
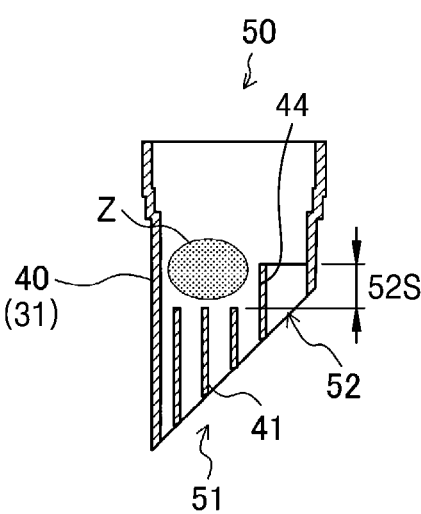
FIG. 9 illustrates an air-flow noise reduction mechanism installed in a pipe connection portion, according to an embodiment.
Figure 10:
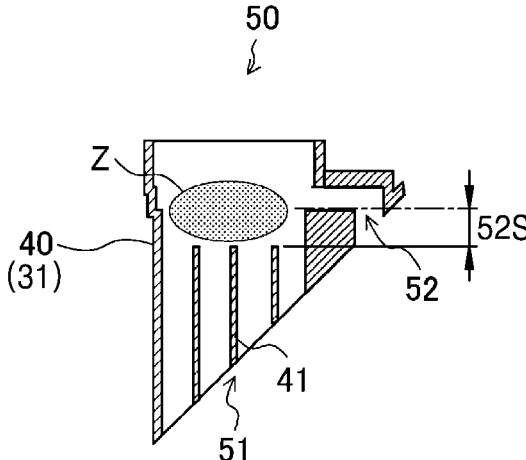
FIG. 10 illustrates an air-flow noise reduction mechanism installed in a pipe connection portion, according to an embodiment.

FIGS. 9 and 10 illustrate embodiments of the air-flow noise reduction mechanism 50 installed in the pipe connection portion 30. The air-flow noise reduction mechanism 50 includes an auxiliary flow path 52 that bypasses the plurality of partition plates 41 to communicate the water supply pipe 11 with the tub 3.

First, referring to FIG. 9, an internal flow path of the connection pipe portion 31 (the pipe connection portion 30), for example, a flow path inside the mounting member 40, may be divided into a main flow path 51 and the auxiliary flow path 52 that bypasses the main flow path 51. The plurality of partition plates 41 according to Measure 1 described above are installed in the main flow path 51. A step 52S is provided between the auxiliary flow path 52 and the main flow path 51 such that an inlet of the auxiliary flow path 52 is located upstream of the main flow path 51. In the present embodiment, the auxiliary flow path 52 is parallel to the main flow path 51. The auxiliary flow path 52 may be distinguished from the main flow path 51 by a second partition plate 44. The upstream end of the second partition plate 44 extends further upstream by the step 52S from the upstream ends of the plurality of partition plates 41.

Next, referring to FIG. 10, the internal flow path of the connection pipe portion 31 (the pipe connection portion 30), for example, the flow path inside the mounting member 40, may include the main flow path 51 and the auxiliary flow path 52 that bypasses the main flow path 51. The plurality of partition plates 41 according to Measure 1 described above are installed in the main flow path 51. The auxiliary flow path 52 is branched from the main flow path 51 on the upstream side of the plurality of partition plates 41. The inlet of the auxiliary flow path 52 may be located upstream by the step 52S from the upstream ends of the plurality of partition plates 41. The auxiliary flow path 52 may partially extend in a direction that is not parallel to the main flow path 51.

Even when the main flow path 51 is clogged by chemicals, water may flow through the auxiliary flow path 52, and thus may be prevented from backflowing. When the flow of the water is maintained, chemical residues Z gradually dissolves, and thus, clogging of the main flow path 51 by the chemicals may be gradually eliminated.

Figure 11:
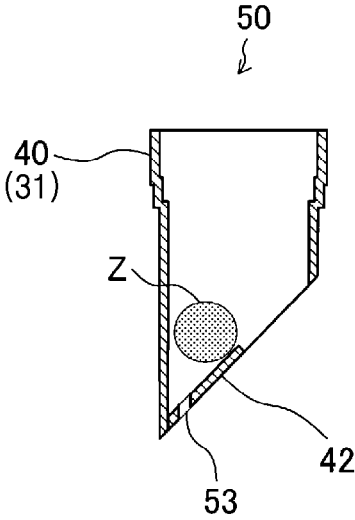
FIG. 11 illustrates an air-flow noise reduction mechanism installed in a pipe connection portion, according to an embodiment.

FIG. 11 illustrates an air-flow noise reduction mechanism installed in the pipe connection portion 30, according to an embodiment. Referring to FIG. 11, a through hole 53 through which water may flow is formed in the partial cover plate 42 corresponding to Measure 2 described above. The chemical residues Z is typically in the form of a lump, and thus, there is a gap between the partial cover plate 42 and the chemical residues Z. By securing the flow of the water through the gap and the through hole 53, backflow of the water due to clogging of the flow path by the chemicals may be prevented.

Figure 12:
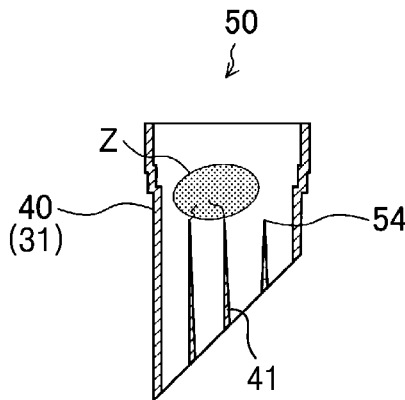
FIG. 12 illustrates an air-flow noise reduction mechanism installed in a pipe connection portion, according to an embodiment.

FIG. 12 illustrates an air-flow noise reduction mechanism installed in the pipe connection portion 30, according to an embodiment. Referring to FIG. 12, among the plurality of partition plates 41 corresponding to Measure 1 described above, an upstream end 54 (a rigid body) of at least the partition plate 41 located on the center side of the flow path may have a sharp shape. When the lump-shaped residues Z, such as chemicals, collides with the sharp end 54 of the partition plate 41, the lump Z becomes easy to collapse and scatter. Accordingly, clogging of the flow path by chemicals or the like may be reduced or prevented.

Figure 13:
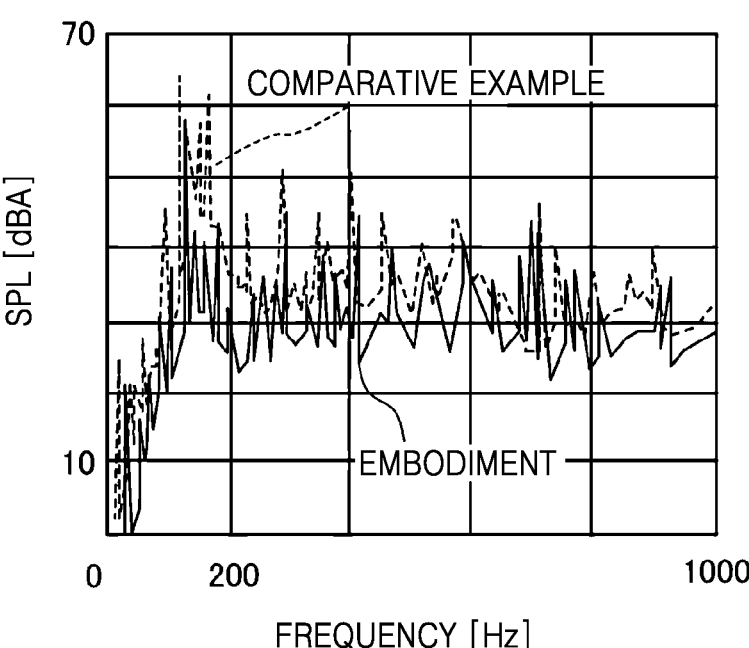
FIG. 13 is a graph showing an example of a noise reduction effect, according to an embodiment.

FIG. 13 is a graph showing an example of a noise reduction effect. A verification test was performed on a noise reduction effect by an air-flow noise reduction mechanism in a spin-drying process. In the test, a spin-drying process (with a maximum rotational speed of 1150 rpm) was performed by using a drum-type washing machine with no laundry in the drum.

Noise (an equivalent noise level) was measured at the upper front side of the casing 2 (i.e., near the detergent case 12), for a case in which the mounting member 40A in which the lattice-shaped air-flow noise reduction mechanism illustrated in FIG. 5 is installed is mounted on the water supply hole (an embodiment), and a case in which the mounting member 40A is not mounted on the water supply hole (a comparative example).

In FIG. 13, the dotted-line graph corresponds to the comparative example, and the solid-line graph corresponds to the embodiment. Referring to FIG. 13, according to the embodiment, lower noise occurs in a frequency range of 1000 Hz or less, in particular, in a low frequency range of 500 Hz or less, compared to the comparative example. Thus, the noise reduction effect according to the embodiment of the air-flow noise reduction mechanism is confirmed.

Embodiments of the washing machine 1 are not limited to the above-described embodiments. For example, in the above-described embodiments, the water supply hole 30B, the vent hole 30C, and the drain hole 30A are described as examples of the pipe connection portion 30, but the pipe connection portion 30 is not limited thereto. The embodiments of the air-flow noise reduction mechanism described above may be applied to any connection portion having the same structure installed on the side surface 3a of the tub 3.

The present disclosure provides a drum-type washing machine capable of reducing noise occurring in a spin-drying process.

A washing machine according to an embodiment of the present disclosure includes a casing having an inlet through which laundry is loaded and taken out; a tub accommodated in the casing in a state in which an inside of the tub is in communication with the inlet, the tub being able to store water; a drum accommodated in the tub to rotate about an axis extending in forward and rearward directions in a state in which the laundry is loaded into the drum; a plurality of pipe connection portions arranged on a side surface of the tub, and to which pipes are connected; and an air-flow noise reduction mechanism installed in at least one of the plurality of pipe connection portions to reduce air-flow noise caused by rotation of the drum.

When an air flow generated in a spin-drying process passes through a pipe connection portion provided on a side surface of the tub, disturbances (e.g., turbulences or eddies) of the air flow may be generated, and as a result, distinctive noise (air-flow noise) may be generated. According to the drum-type washing machine of the present disclosure, noise occurring in a spin-drying process may be reduced by arranging an air-flow noise reduction mechanism at a pipe connection portion that causes the noise.

In an embodiment, the air-flow noise reduction mechanism may include one or more partition plates extending from an edge of an opening of the at least one pipe connection portion toward an inside of the pipe connection portion in a direction in which the pipe connection portion extends.

According to a result of fluid analysis, it is confirmed that, by installing the partition plates, changes in the flow and velocity of air circulating in the tub, which are presumed to be the cause of the noise, are suppressed. In addition, it is confirmed that an increase in the velocity of air swirling inside the tub is also suppressed. Thus, by installing such an air-flow noise reduction mechanism at a pipe connection portion, noise occurring in a spin-drying process may be reduced.

In an embodiment, the one or more partition plates may include a plurality of partition plates. The plurality of partition plates may be arranged to be parallel to each other or to intersect each other, with gaps therebetween. One or more partition plates may be provided, and a better effect may be expected by installing a plurality of partition plates.

In an embodiment, a water supply pipe for supplying water to the tub may be connected to the pipe connection portion. The pipe connection portion may include a main flow path in which the plurality of partition plates are installed, the main flow path being in communication with the tub. The air-flow noise reduction mechanism may include an auxiliary flow path that bypasses the main flow path inside the pipe connection portion to be in communication with the tub. An inlet of the auxiliary flow path may be located upstream of an inlet of the main flow path. The auxiliary flow path may be parallel to the main flow path. The auxiliary flow path may partially extend in a direction that is not parallel to the main flow path.

In the drum-type washing machine, chemicals such as a detergent may be supplied along with water supply. The flow path (a water supply path) may be clogged by remaining undissolved chemicals. According to the present embodiment, by forming the auxiliary flow path that bypasses the main flow path, water flows through the auxiliary flow path even when the main flow path is clogged by chemicals or the like, and thus, backflow or the like may be prevented. When the flow of the water is maintained, residues of the chemicals or the like gradually dissolve, and thus, clogging of the main flow path by the chemicals may be gradually eliminated.

In an embodiment, a water supply pipe for supplying water to the tub may be connected to the pipe connection portion. At least one of the plurality of partition plates may have a sharp upstream end. In this case, residues of chemicals or the like collide with the sharp end of the partition plate, and thus, the lump of the residues becomes easy to collapse and scatter. Accordingly, clogging of the flow path by chemicals or the like may hardly occur.

In an embodiment, the air-flow noise reduction mechanism may include a partial cover plate that covers a portion of an opening of the pipe connection portion. As a result of fluid analysis, it is confirmed that, by installing the partial cover plate, changes in the flow and velocity of air circulating in the tub, which are presumed to be the cause of the noise, are suppressed. In addition, it is confirmed that an increase in the velocity may also be suppressed. Thus, by installing such an air-flow noise reduction mechanism, noise occurring in a spin-drying process may be reduced.

In an embodiment, a water supply pipe for supplying water to the tub may be connected to the pipe connection portion. The air-flow noise reduction mechanism may include a through hole formed in the partial cover plate to allow water to flow therethrough. In this way, the flow of water may be secured through the through hole. Therefore, it is possible to prevent backflow of water due to clogging of the flow path by chemicals.

In an embodiment, the washing machine may further include a water supply device configured to supply water to the tub through a water supply pipe connected to the pipe connection portion. In an embodiment, the washing machine may further include a drainage device configured to drain water from the tub through a drain pipe connected to the pipe connection portion.

In an embodiment, the washing machine may further include a mounting member inserted into the pipe connection portion. The air-flow noise reduction mechanism may be arranged in the mounting member. The pipe connection portion may include a connection pipe portion. The mounting member may be inserted into the connection pipe portion. The mounting member may be formed of an elastic material.

In this way, the air-flow noise reduction mechanism may be installed in the pipe connection portion simply by mounting the mounting member. An air-flow noise reduction mechanism may be installed simply and inexpensively in an existing drum-type washing machine. That is, the air-flow noise reduction mechanism may be easily put into practical use. The mounting member may be formed of an elastic material. In this way, even when there is a slight shaping error in the mounting member, the mounting member may be easily mounted on the pipe connection portion, and air-flow noise may also be expected to be reduced due to the elasticity of the mounting member.

The above-described embodiments may be implemented in appropriate combination. Although embodiments have been described above in detail, the scope of the present disclosure is not limited thereto, and various modifications and alterations by those skill in the art using the basic concept of the present disclosure defined in the following claims also fall within the scope of the present disclosure.

The invention claimed is:

1. A drum-type washing machine comprising:
a casing having an inlet through which laundry is loadable and unloadable;
a tub in the casing and configured such that an inside of the tub is accessible through the inlet, the tub configured to store water;
a drum in the tub, the drum configured to rotate about an axis extending along forward and rearward directions;
a pipe connection portion on a side surface of the tub, and configured to be connected to a pipe; and
an air-flow noise reduction mechanism in the pipe connection portion, and configured to control air-flow caused by rotation of the drum, the air-flow noise reduction mechanism including:
a plurality of partition plates spaced apart from one another with gaps therebetween, each partition plate of the plurality of partition plates extended across an opening of the pipe connection portion from a first edge of the opening to a second edge of the opening that is opposite to the first edge, or
a partial cover plate that covers a first portion of an opening of the pipe connection portion such that a second portion of the opening of the pipe connection portion is uncovered, the first portion being one of:

a central portion of the opening, wherein the partial cover plate is supported by a support piece extended between an edge of the opening and the partial cover plate,
a downstream portion of the opening that extends from a downstream edge of the opening toward a middle of the opening, wherein the second portion that is uncovered includes an upstream portion that extends from an upstream edge of the opening toward the middle of the opening, or
the upstream portion of the opening, wherein the second portion that is uncovered includes the downstream portion.

2. The drum-type washing machine of claim 1, wherein the air-flow noise reduction mechanism reduces air-flow noise caused by the rotation of the drum, and the plurality of partition plates extend at least partially into the opening along an axial direction of the pipe connection portion.

3. The drum-type washing machine of claim 2, wherein the plurality of partition plates are in parallel to each other.

4. The drum-type washing machine of claim 2, wherein a first partition plate of the plurality of partition plates intersects a second partition plate of the plurality of partition plates with gaps therebetween.

5. The drum-type washing machine of claim 2, wherein a water supply pipe to supply water to the tub is connected to the pipe connection portion, and
the pipe connection portion includes a main flow path in which the plurality of partition plates are installed, the main flow path being in communication with the tub, and
the air-flow noise reduction mechanism includes an auxiliary flow path that bypasses the main flow path inside the pipe connection portion to be in communication with the tub.

6. The drum-type washing machine of claim 5, wherein an inlet of the auxiliary flow path is located upstream of an inlet of the main flow path.

7. The drum-type washing machine of claim 5, wherein the auxiliary flow path is parallel to the main flow path.

8. The drum-type washing machine of claim 5, wherein the auxiliary flow path partially extends along a direction that is not parallel to the main flow path.

9. The drum-type washing machine of claim 2, wherein a water supply pipe to supply water to the tub is connected to the pipe connection portion, and
at least one partition plate of the plurality of partition plates has a sharp upstream end.

10. The drum-type washing machine of claim 1, wherein the air-flow noise reduction mechanism is the partial cover plate having the first portion that covers the central portion of an opening,
the support piece is among a plurality of support pieces that are extended between opposing edges of the opening and the partial cover plate, and
the second portion is among a plurality of second portions, each second portion of the plurality of second portions extending between the edge of the opening, the partial cover plate, and two adjacent support pieces of the plurality of support pieces.

11. The drum-type washing machine of claim 1, wherein a water supply pipe to supply water to the tub is connected to the pipe connection portion,
the air-flow noise reduction mechanism includes the partial cover plate, and

a through hole is formed in the partial cover plate to allow water to flow therethrough.

12. The drum-type washing machine of claim 1, further comprising a water supply device configured to supply water to the tub through a water supply pipe connected to the pipe connection portion.

13. The drum-type washing machine of claim 1, further comprising a drainage device configured to drain water from the tub through a drain pipe connected to the pipe connection portion.

14. The drum-type washing machine of claim 1, further comprising a mounting member insertable into the pipe connection portion, wherein the air-flow noise reduction mechanism is arranged in the mounting member.

15. The drum-type washing machine of claim 14, wherein the pipe connection portion includes a connection pipe portion, and the mounting member includes an elastic material and is inserted into the connection pipe portion.

* * * * *